United States Patent [19]

Gillette, deceased et al.

[11] 4,151,884
[45] May 1, 1979

[54] POWERED DUAL-ROTOR WEEDING MACHINE FOR STALKS CROP

[76] Inventors: John F. Gillette, deceased, late of Greenwood, Miss., by Thelma A. Gillette, administratrix, 507 River Rd., Greenwood, Miss. 38930

[21] Appl. No.: 794,029

[22] Filed: May 5, 1977

[51] Int. Cl.$^2$ ............................................. A01B 33/00
[52] U.S. Cl. .................................................. 172/57
[58] Field of Search ..................... 172/48, 49, 57, 58, 172/81, 107, 108, 109, 111, 112, 119, 124, 125, 520, 521, 527, 532; 171/57

[56] References Cited

U.S. PATENT DOCUMENTS

| | | | |
|---|---|---|---|
| 1,184,276 | 5/1916 | Townsend | 172/57 |
| 1,399,074 | 12/1921 | Perry | 171/57 |
| 1,419,953 | 6/1922 | Binmore | 172/57 |
| 1,428,194 | 9/1922 | Von Meyenburg | 172/125 |
| 1,561,978 | 11/1925 | Garcia | 172/125 |
| 2,876,851 | 3/1959 | Gillette | 172/57 |
| 3,485,305 | 12/1969 | Van Brunt | 172/119 X |

FOREIGN PATENT DOCUMENTS 1049136  1/1959 Fed. Rep. of Germany .......... 172/124

*Primary Examiner*—Richard T. Stouffer
*Attorney, Agent, or Firm*—Williamson, Bains, Moore & Hansen

[57] ABSTRACT

A weeding machine for stalk crops includes a pair of driven rotors which are disposed on opposite sides of a row crop, such as cotton. Each rotor includes a plurality of longitudinally spaced apart spiral blades and a rearwardly positioned cone. The rotors are arranged in forwardly converging relation with respect to each other. Weeds and accumulating soil are impelled outwardly from the spaces between adjacent rotor blades, and the cone of each rotor serves to smooth the soil displaced by the rotors.

5 Claims, 5 Drawing Figures

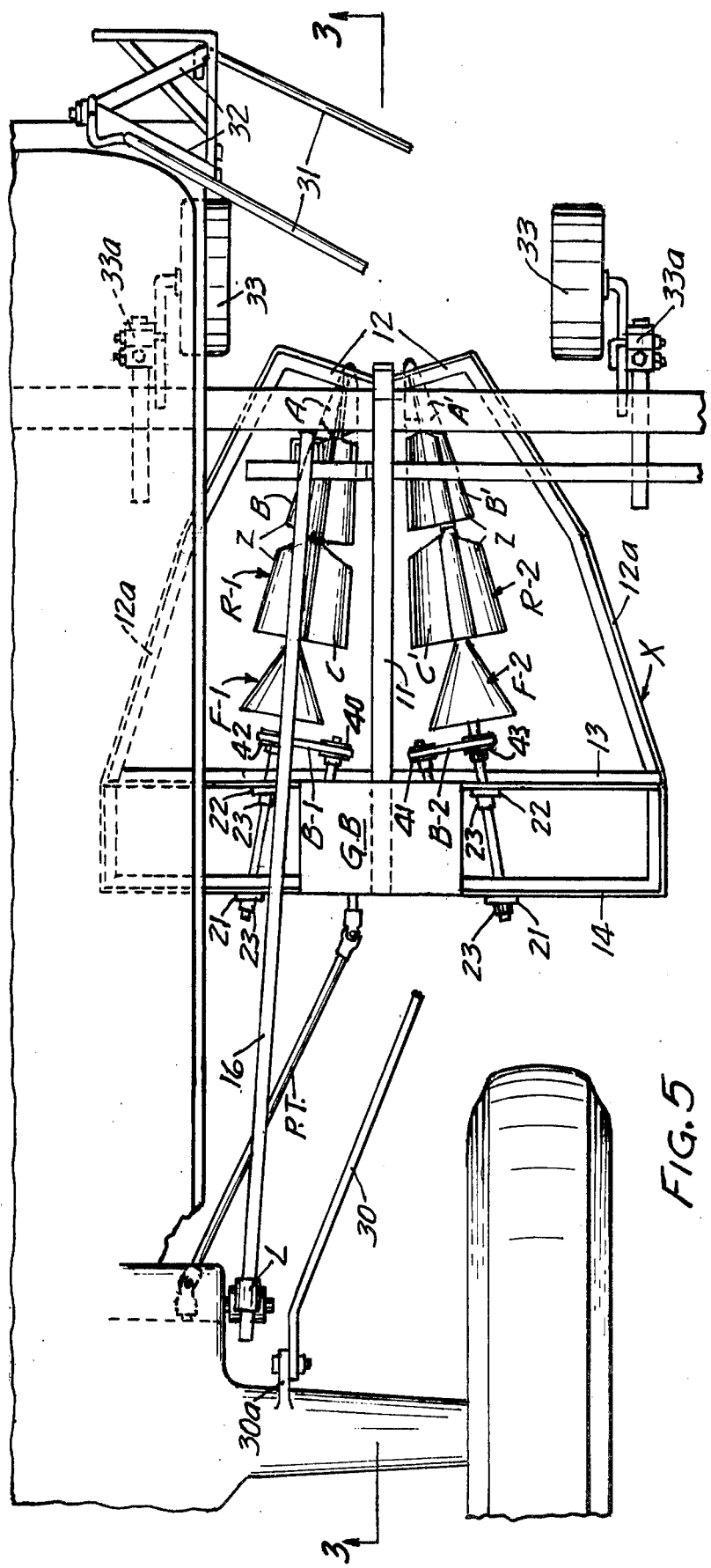

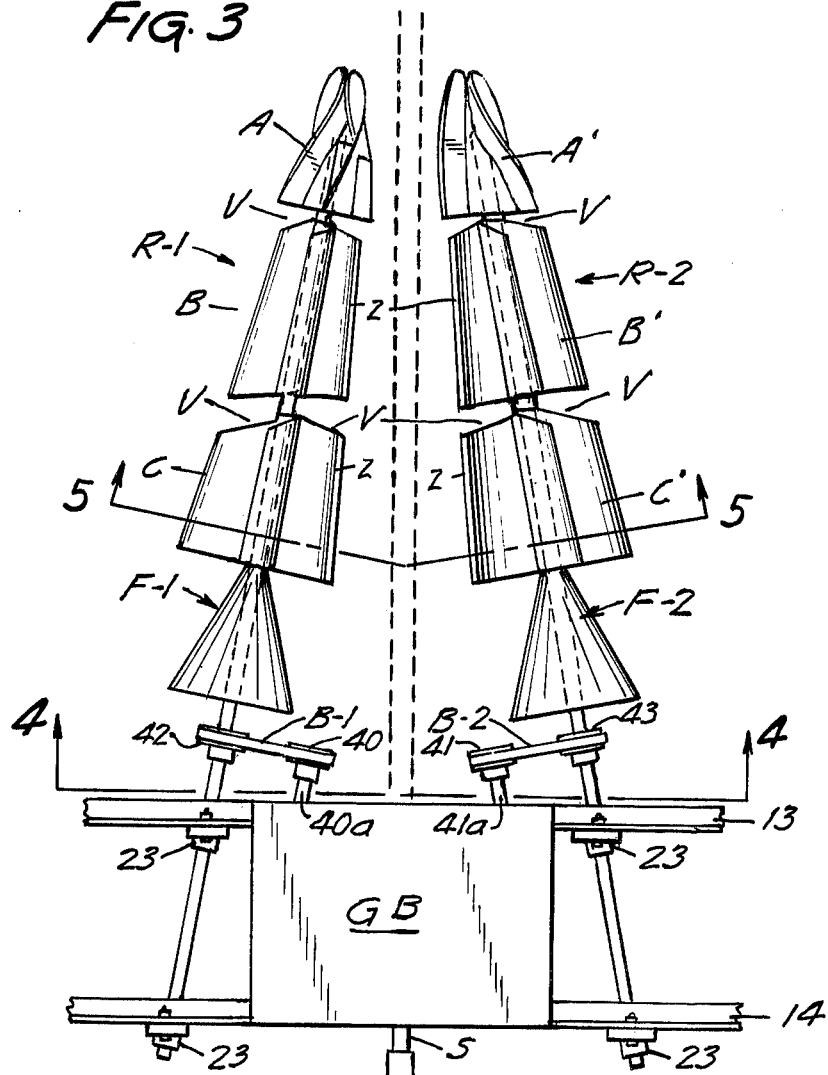
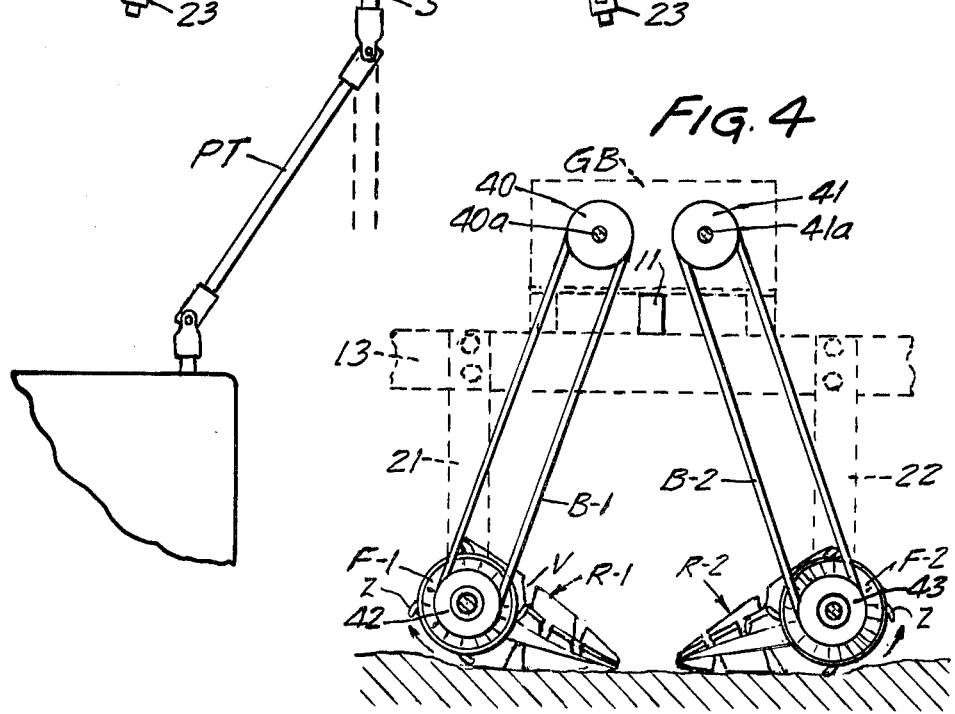

POWERED DUAL-ROTOR WEEDING MACHINE FOR STALKS CROP

The invention of this application, in several important respects, constitutes an improvement on the invention of U.S. Pat. No. 2,876,851 issued to the inventor herein Mar. 10, 1959.

BACKGROUND OF THE INVENTION

The prior art is best summarized and disclosed in the inventor's said U.S. Pat. No. 2,876,851. The structure of said patent was quite successful in extensive actual usage for the power weeding of cotton crops from early stages of growth up until a month or few weeks of harvest time, provided that the soil was not sticky or infiltrated with clay, gumbo or other adhesive materials; and also provided that at the time of its operation the soil was not wet. This prior art machine was suspended from a skeleton frame from a tractor or other vehicle adapted to travel between rows of stalk crops. It employed a pair of horizontal axes, rotors driven in opposite directions from gear transmissions connected with the power take-off of the tractor. The two soil-engaging rotors were mounted in forwardly converging relation with the acute angle defined by the two axes, disposed longitudinally of the line of travel of the vehicle. The rotors, each had a plurality of soil-engaging elements in the form of continuous, longitudinal gently spiraled fins, the fins increasing in width from the hub from their blunt noses rearwardly to generate in revolution conical figures being spaced apart to travel and straddle a row of ground stalks, and with the under-portions only of the periperies of said fins engaging the soil. The original construction required bearings for each of the rotors suspended from the supporting frame and disposed inwardly relatively short distances from the blunt front noses of the rotors. Second sets of bearings were required for revolubly mounting the rear portions of the rotors and the driving chains or belts for powering the rotors were disposed just rearwardly of the second set of bearings. It was also essential in the earlier construction to provide plate-like, downwardly extending guards which could press against the stalks of the row, hopefully preventing interference of stalks and displacement thereof in the working of the machine.

In wet and/or sticky condition of the soil, the forward bearings for the rotors were adversely affected and sludge from soil would continue to pack up and accumulate on the continuous spirals of the two rotors. The guard plates were also objectionable after the crops and stalks were more mature and had spread, and with no protection for the driving chains these would be adversely affected and operate often with difficulty in adverse soil conditions.

It is a main object of the present invention to prevent and inhibit all of these adverse conditions regardless of moist or wet soil, or even soil having clay deposits and sticky substances, therein. It is a further object to dispense with any bearings from depending supports which revolubly mount any parts of the actual working elements of the weeding rotors.

A further object is the provision of means for gently replacing the stalks in upraised position and for avoiding accumulation or contact of cut soil or weeds with any of the driving connections at the rear of the rotors.

SYNOPSIS OF THE INVENTION

Basically the invention employs a pair of novel and multi-functional, oppositely revolved, soil-engaging rotors mounted in side-by-side relation for straddling a row crop and spaced apart a short distance with their under portions only engaging the soil. These novel rotors have blunt noses and hub portions extending on generally horizontal axes with a series of longitudinal fins gently spiraled and forming a plurality of segments or series of cutting edges extending from the noses throughout the greater portions of the length thereof. The fins on the two rotors are oppositely spiraled and are driven in opposite directions so that the fin sections are successively moved inwardly towards the stalks, then downwardly and then outwardly relative to the ground stalks of the crop row, thereby removing from each side of the row, wees and a shallow stratum of soil in the travel of the machine over the ground. The spiral fins for each rotor are made up of a plurality of multi-spiral sections or segments spaced apart to provide voids outwardly of the axles or hub sections, whereby any accumulating soil on the fins is centrifugally released and thrown outwardly in the operation of the rotors.

The hubs and axle shafts for the rotors extend rearwardly beyond the flights which are spiraled and are revolubly mounted in two or more bearings, both for each rotor disposes rearwardly of the weeding operations of the rotors. The several sections or sgements of spiral fins in revolution, generate conical geometrical figures with the forward ends constituting blunt noses and with the said voids between segments thereof being annular. A plurality of said flights of spirally disposed fins are employed in each segment or section of the rotor and these may be in continuing spiral flight formation or somewhat offset therefrom.

Mounted axially of the hubs of the rear end section, each rotor has a relatively large, truncated conical multi-functional element revolved with the hub and shaft and coaxially disposed and having a smooth external surface which may lightly engage ground portions of the row crop which are not in erect position, and which further, at its closed rear end serves to guard driving connections for the rear rotor ends such as chains or belts.

DETAILED DESCRIPTION OF AN EMBODIMENT OF THE INVENTION

The structure, essential components, functions and new results obtained from inventor's improvements will be more fully understood from the following description made in conjunction with the accompanying drawings wherein like reference characters refer to similar parts throughout the several views thereof, and in which:

FIG. 2 is a plan view of the same with some parts and portions being broken away;

FIG. 3 is a view taken generally along the irregular section line 3—3 of FIG. 1 and showing in top plan view the essential components and elements of the improvements of this invention, to wit: the driven rotor structure and attachments to the hubs thereof, as well as driving connections and protections therefor;

FIG. 4 is a vertical section taken on the angled section line 4—4 of FIG. 3; and FIG. 5 is a cross-sectional view taken approximately along lines 5—5 of FIG. 3 and looking in the direction of the arrows.

Figure 1:
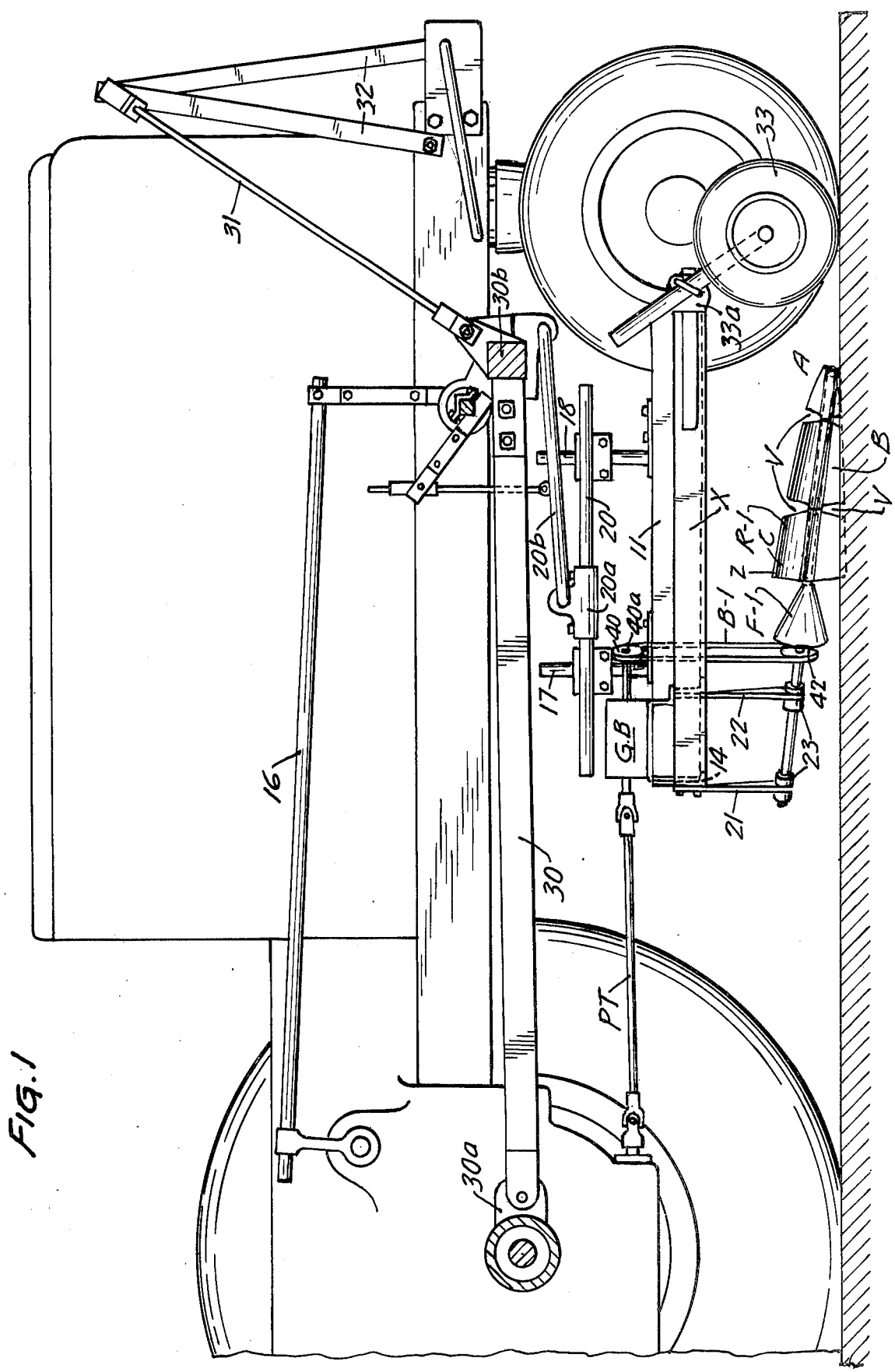
FIG. 1 is a view mostly in side elevation with some portions broken away, showing an embodiment of the improved weed-cutting machine mounted operatively upon a conventional farm tractor.

As shown in the drawings, my improved rotary weeding machine is mounted on the right side portion of a conventional type farm tractor which has the usual widely spaced powered rear wheels and a pair of front wheels mounted in similar spaced relation. The tractor illustrated is of a type which will straddle two rows of stalk crops and as shown, my weeding machine is mounted on the right side portion of the tractor supported upon and secured to a large skeleton frame X which has a short pair of forward rails 12 and oppositely diagonal side rails 12a with a heavy interconnecting transverse rear bar or rail 14 and an intermediate supporting rail 13 interconnecting the sides of the frame. A central longitudinal, very heavy longitudinal rail 11 is also provided in the skeleton framework structure.

It will be understood that my weeding machine may be mounted and supported upon a small wheeled frame or sled-type frame pulled by a tractor vehicle or truck.

Mounting frame X is suspended for limited up and down adjustment by suitable means and as shown, is directly supported from the forward end of a very heavy bar or shaft 16 which at its rear portion is affixed to the powered lift lever L supplied by the tractor. As shown, support is made through a pair of longitudinally spaced, heavy, upstanding support studs 17 and 18 which have their lower ends rigidly affixed to the central, very heavy longitudinal frame bar 11. The upper ends of studs 17 and 18 are rigidly and adjustably interconnected by clamping brackets with a horizontally extending heavy rod 20 which as shown, carries an intermediate sleeve bracket 20a which is pivotally connected with an equalizing bar 20b, forming part of a self-leveling parallelogram mechanism.

The said self-leveling, parallelogram mechanism is similar to that disclosed in the inventor's issued patent and therefore will not be described in great detail. It includes however an elongate lever arm 30 pivotally connected at its rear to a shackle 30a surrounding the axle housing of the tractor at the rear thereof. It includes also a forward bar 30b which is connected by linkage 31 with an upstanding post construction 32 mounted rigidly upon the forward end of the tractor.

A transmission gear box or case GB is supported in upright position in the medial rear portion of frame X, having mounted therein suitable transmission for first receiving rotary power from the power takeoff shaft of the tractor PT, which has uiversal connections at forward and rear ends for driving. The forward end of the power takeoff extends by a small shaft S, to the powered shaft within the gear box GB, which in turn drives in opposite directions two forwardly somewhat convergent shafts for driving two suspended rotors designated in entirety by the letters R-1 and R-2.

A pair of gauge-depth wheels 33 are mounted on the forward portion of frame X for vertical adjustment in heavy brackets 33a.

THE MULTI-FUNCTIONAL WEEDING ROTORS

The main features of the instant invention consist in the multi-functional structure and new results obtained from inventor's changes and improvements on the overall rotary weeding rotors and the support and driving thereof.

The two rotors indicated as entireties by R-1 and R-2 (left and right rotors as viewed from the driver's seat of the tractor) each include preferably a plurality (as shown, 3) of longitudinally spaced, weed-cutting and soil-removing sections respectively identified in the drawings as A, B and C on the left hand rotor and A', B', and C' on the right hand rotor. Voids formed by slots or recesses in the cutting fins are formed between successive secions so that annular openings concentric to the hubs of the rotors are produced. The said sections relative to the hubs of the two rotors are thus longitudinally spaced and the voids produced provide discharge passages for expelling, with the aid of centrifugal force, a sticky soil or other material which otherwise might continue to accumulate on the continuous blades or spiral flights of the patented invention. The expelling of such materials through said voids is enhanced by the increasing diameter of the hub section of each rotor.

The successive spaced sections or segments of the overall weeding rotors are preferably of generally increasing spiral widths of the fins or cutting blades and the endmost rotor sections C and C' respectively end abruptly at the spiral blades. The rotors directly rearwardly of the blade fins and coaxially mounted on the hub include multi-functional coaxial truncated conical elements F-1 and F-2 respectively, which taper forwardly to abut the rear ends of the blade fins of the sections C and C'. The rear and largest diameter of the conical elements F-1 and F-2 is somewhat less than the largest circumferential circle of the cutting blades. These frusto-conical elements F-1 and F-2 are closed at their rear ends to protect forward support bearings for the axles or hubs of the rotors and to further protect the respective driving belts or chains for the rotors from dirt or debris during operation of the weeding device and forward travel thereof. The elements F-1 and F-2 further serve to lightly brush any stalks of the row crop which may have drooped during the weeding operation to restore the stalks in upraised position. The same elements F-1 and F-2 further function to smooth the debris and soil rearwardly of the weeding operation, thereby making more uniform shallow gutters between adjacent rows of stalk crop to better prepare the soil for irrigation or flow of rainfall.

The hubs or axles of the rotors are extended for some distance rearwardly of the elements F-1 and F-2 and are journaled and supported in widely spaced, efficient bearings suspended from the frame X of the rotary weeding machine by very heavy brackets 21 and 22 respectively. All bearings are numbered 23.

While the blade fins of the two rotors are disposed in flights gently spiraled in relation to the direction of revolution of the rotors, it is to be understood that radial fins or blades may be employed although the same are somewhat less effective. As shown, four flights or sets of the blade fins are provided for each of the sections A, B, C, and A', B', and C', although it is of course understood that the number and multiplicity of fins may be varied.

The driving connections for the two weeding rotors R-1 and R-2 in the embodiment illustrated comprise forward driving elements such as V pulleys 40 and 41 which are affixed to oppositely driven shafts 40a and 41a respectively, which protrude from the forward end of the gear box GB. The shafts 40a and 41a converge somewhat in forward direction in conformity to the axes or hubs of the two rotors and are driven by transmission mechanism (not shown) within gear box GB and in opposite directions and similar speed. The curved arrows of FIG. 4 indicate the direction of rotation. V-belts B-1 and B-2 respectively connect pulleys 40 and 41 with drive V-belt pulleys 42 and 43 affixed to the hub axle extensions of the rotors just rearwardly of the conical members F-1 and F-2. The speed of revolution of the two rotors is metered by means of the transmission mechanism contained in gear box GB, taking into consideration the speed of the power takeoff shaft PT from a tractor, so that with the tractor traveling at from 4 to 6 miles per hour, the rotors will revolve between 200 and 400 r.p.m., producing very efficient cutting and outward movement of the weeds from the sides of the stalks without, however, speeds which would throw weeds and material in the manner referred to as "tedding".

It will be understood that means for variably spacing, within limits, the bearings 23 for the rotors will preferably be provided (not shown), so that spaced adjustment between rotors may be varied somewhat for different types and stages of growth of stalk plants.

OPERATION

While the general operation of my improved weeding will probably be obvious from the foregoing description, it is thought desirable to point out numerous new functions and favorable results obtained through the improvements of this patent application.

First, it will be noted that the two blunt forward noses of rotors R-1 and R-2 are spaced apart to nicely straddle the stalks of crop rows near ground level and slightly thereabove. The increasing, spiralling radius of the blade sections due to the forward converging of the hubs of the rotors leaves the edges of the fins in about the same spaced relation as at the noses of the rotors.

The gauge wheels 33 have been adjusted to position in lower adjustment of the skeleton frame X, the rotors for the desired weed-cutting depth. In such position the blunt noses of the rotors are for the most part disposed on their lower edges, at approximately ground level to cause the successive spiral blades or cutting fins in sections A, B, and C, and A', B', and C', to engage the soil. In this connection it will be seen that the rear portions of the rotors are partially supported by the frusto-conical multi-functional elements supported bearings 23 in spaced relation beyond the rear ends of the hubs of the rotors.

In driving and guiding the machine, the operator on the seat of the tractor may look downwardly from above, and using the heavy longitudinal frame beam 11 may use this as a central longitudinal marker to chart his course.

As stated, the multi-functional, conical elements F-1 and F-2 serve the further function in addition to protecting the driving connections and lightly brushing inwardly inclined stalks, to partially and lightly support the rear portions of the rotors from the ground. As previously stated the same elements F-1 and F-2, in their rotative functions, smooth the soil displaced by the rotors, as well as weeds, helping to form relatively smooth surfaces between rows, which enhances irrigation or flow of water and distribution through rainfall.

The voids identified as V between thin sections of the two rotors, with the help of centrifugal force, will expel and throw out accumulating soil, short weeds and other debris, and such material will be expelled before action of the rotary elements F-1 and F-2 which tend to smooth the debris and soil after the action of the rotors.

The new and improved support and mounting for the rotors from largely the bearings 23 and to some extend the elements F-1 and F-2 overcome the need for forward bearings on the rotor as was essential in the original invention of the U.S. Pat. No. 2,876,851.

It will be understood that various changes in the formation of the preferably gently spiraled blade sections may be made as well as the mounting of my weeding machine for travel over the ground.

What is claimed is:

1. A power-driven weeding machine for row crops, having in combination:

a generally horizontal frame adapted for mounting on a vehicle some distance above ground level, a pair of oppositely revolved weed-cutting and soil-engaging rotors suspended in spaced side-by-side relation to closely straddle the ground stalks of a crop row and mounted with their under portions only engaging the soil, said rotors each comprising several sets of spaced blade-fin elements affixed to a common axial hub, the hubs of said two rotors converging slightly from their rearward to their forward ends, the spaces between said blade-fin elements providing substantial recesses transversely of the hubs, through which with the aid of centrifugal force, soil and other material accumulating upon said elements will be thrown outwardly and expelled in the forward movement of the machine, means for simultaneously driving said rotors in opposite directions to cause said blade-fins, relatively to the ground stalks, to successively move inwardly, then downwardly and then outwardly, thereby cutting and removing weeds and shallow strata of soil outwardly from both sides of the row crop in the travel of said machine, and each of said rotors having a smooth exterior, frusto-conical element concentrically affixed to the rotor hub and disposed just rearwardly of the rearmost fin elements, said conical elements tapering forwardly and having maximum rear circumferences somewhat less than the circumferences of the rear of the geometric figures generated by the revolution of said rear fin elements.

2. The structure and combination set forth in claim 1 wherein said rotor driving means include driven elements affixed to the respective rotor hubs just rearwardly of the rear ends of said frusto-conical elements, a power transmission mechanism mounted in said frame and driven by a source of power provided by said vehicle, said transmission mechanism having a pair of oppositely revolved driving elements disposed respectively above the driven elements affixed to said rotor hub and revolving on axes parallel respectively with the axes of said driven elements, and endless driving elements connecting respectively, said driving elements with said rotor driven elements.

3. The structure and combination set forth in claim 2 wherein the hubs of said rotors are axially extended some distance rearwardly of said rotor driven elements, and wherein for each hub extension a pair of widely spaced bearings is provided suspended from heavy brackets which are rigidly attached to said horizontal frame, said bearings with the aid of said frusto-conical elements consitituting the main supports for said rotors.

4. The structure and combination set forth in claim 1 wherein said blade-fins of the rotor sections are gently spiraled in the direction of revolution of the respective rotors.

5. The structure and combination set forth in claim 1 wherein the hubs of said rotors are axially extended some distance beyond the rear ends of said blade-fin elements, and a pair of suspended spaced bearings for each of said extensions constituting the main support for said rotor.

* * * * *